(12) United States Patent
Huang et al.

(10) Patent No.: US 11,726,584 B1
(45) Date of Patent: Aug. 15, 2023

(54) TOUCHPAD MODULE AND COMPUTING DEVICE USING SAME

(71) Applicant: Primax Electronics Ltd., Taipei (TW)

(72) Inventors: Wei-Chiang Huang, Taipei (TW); Chao-Wei Lee, Taipei (TW); Hsueh-Chao Chang, Taipei (TW); Chieh-Hung Hsieh, Taipei (TW); Sian-Yi Chiu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/952,557

(22) Filed: Sep. 26, 2022

(30) Foreign Application Priority Data

Sep. 4, 2022 (TW) .................................. 111133474

(51) Int. Cl.
| | |
|---|---|
| *G06F 3/033* | (2013.01) |
| *G06F 3/0354* | (2013.01) |
| *G06F 1/16* | (2006.01) |
| *G06F 3/01* | (2006.01) |
| *G06F 3/02* | (2006.01) |

(52) U.S. Cl.
CPC ........ *G06F 3/03547* (2013.01); *G06F 1/1616* (2013.01); *G06F 3/016* (2013.01); *G06F 3/0202* (2013.01)

(58) Field of Classification Search
CPC ........ G06F 1/1616; G06F 1/169; G06F 3/016; G06F 3/0202; G06F 3/03547
See application file for complete search history.

(56) References Cited

U.S. PATENT DOCUMENTS

| | | | | |
|---|---|---|---|---|
| 9,348,414 | B2 * | 5/2016 | Kagayama | G06F 3/041 |
| 9,772,688 | B2 * | 9/2017 | Patel | H01F 7/126 |
| 10,275,032 | B2 * | 4/2019 | Olien | C09D 11/52 |
| 10,990,140 | B2 * | 4/2021 | Chang | G06F 1/169 |
| 11,372,457 | B1 * | 6/2022 | Lee | G06F 3/03547 |
| 11,402,931 | B1 * | 8/2022 | Lee | G06F 1/169 |
| 2006/0181517 | A1 * | 8/2006 | Zadesky | G06F 3/0362 345/173 |

(Continued)

FOREIGN PATENT DOCUMENTS

CN 216133387 U * 3/2022

*Primary Examiner* — Joe H Cheng
(74) *Attorney, Agent, or Firm* — Kirton McConkie; Evan R. Witt (57) ABSTRACT

A touchpad module includes a base plate, a touch member, plural supporting elements, plural pressure sensing units and a feedback generation element. The base plate includes a plate body and plural elastic arms. The plural elastic arms are formed on the plate body. The plural supporting elements are arranged between the base plate and the touch member, and aligned with the corresponding elastic arms. While the touch member is moved toward the base plate, the plural supporting elements are move downwardly with the touch member to press the corresponding elastic arms. Consequently, the plural elastic arms are subjected to deformation. If the deformation amount of at least one of the plural elastic arms reaches a threshold value, the corresponding pressure sensing unit issues a pressure sensing signal. The feedback generation element generates a haptics feedback effect in response to the pressure sensing signal.

10 Claims, 10 Drawing Sheets

(56) References Cited

U.S. PATENT DOCUMENTS

| | | | | |
|---|---|---|---|---|
| 2007/0139388 | A1* | 6/2007 | Lee | G06F 1/169 |
| | | | | 345/173 |
| 2012/0162143 | A1* | 6/2012 | Kai | H04M 1/0266 |
| | | | | 345/177 |
| 2013/0328820 | A1* | 12/2013 | Kondoh | G06F 1/1643 |
| | | | | 345/173 |
| 2014/0320440 | A1* | 10/2014 | Satake | G06F 3/0483 |
| | | | | 345/173 |
| 2018/0107378 | A1* | 4/2018 | Rosenberg | G06F 3/04144 |
| 2019/0243475 | A1* | 8/2019 | Huang | G06F 1/1681 |
| 2021/0149491 | A1* | 5/2021 | Takahashi | G06F 3/03547 |
| 2022/0113819 | A1* | 4/2022 | Li | G06F 1/169 |

* cited by examiner

TOUCHPAD MODULE AND COMPUTING DEVICE USING SAME

CROSS-REFERENCE TO RELATED APPLICATION

This application claims priority under 35 U.S.C. § 119 of Taiwan Application No. TW 111133474 filed on Sep. 4, 2022, the disclosure of which is incorporated by reference.

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

Figure 1:
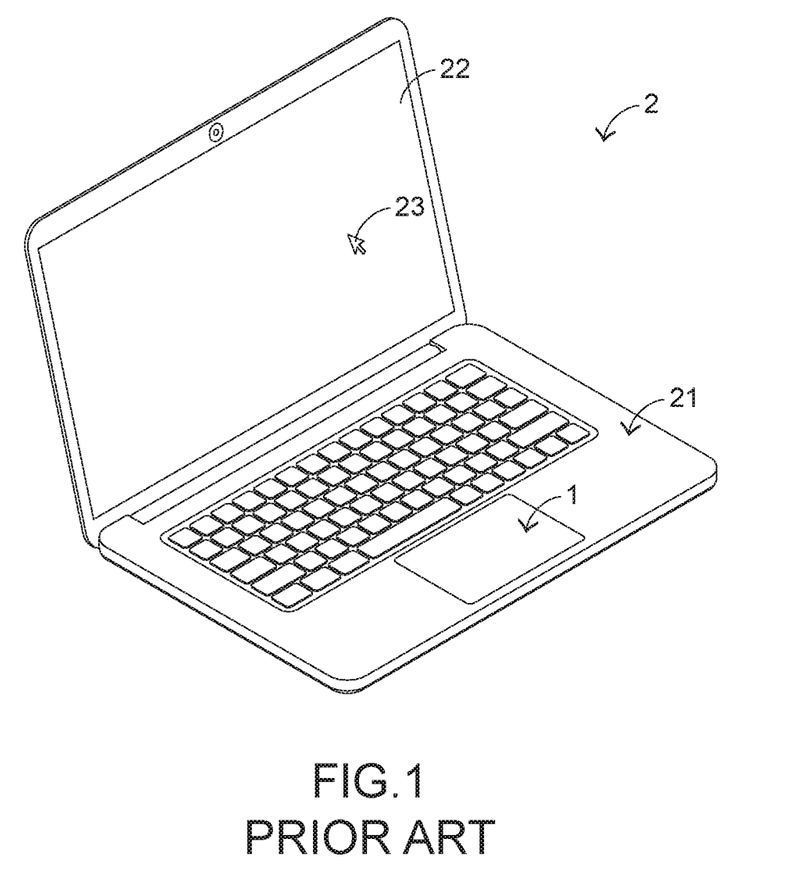
FIG. 1 schematically illustrates a conventional notebook computer with a touchpad module.

FIG. 1 schematically illustrates a conventional notebook computer with a touchpad module. As shown in FIG. 1, the touchpad module 1 is installed on a casing 21 of the notebook computer 2. Moreover, at least a portion of the touchpad module 1 is exposed outside so as to be touched by the user's finger. Consequently, the user may operate the touchpad module 1 to control the notebook computer 2. For example, in case that the user's finger is placed on the touchpad module 1 and slid on the touchpad module 1, a cursor 23 shown on a display screen 22 of the notebook computer 2 is correspondingly moved. Moreover, in case that the touchpad module 1 is pressed down by the user's finger, the notebook computer 2 executes a specified function. The use of the touchpad module 1 can implement some functions of the conventional mouse. In other words, the user may operate the notebook computer 2 through the touchpad module 1 without the need of additionally carrying or installing the mouse.

Figure 2:
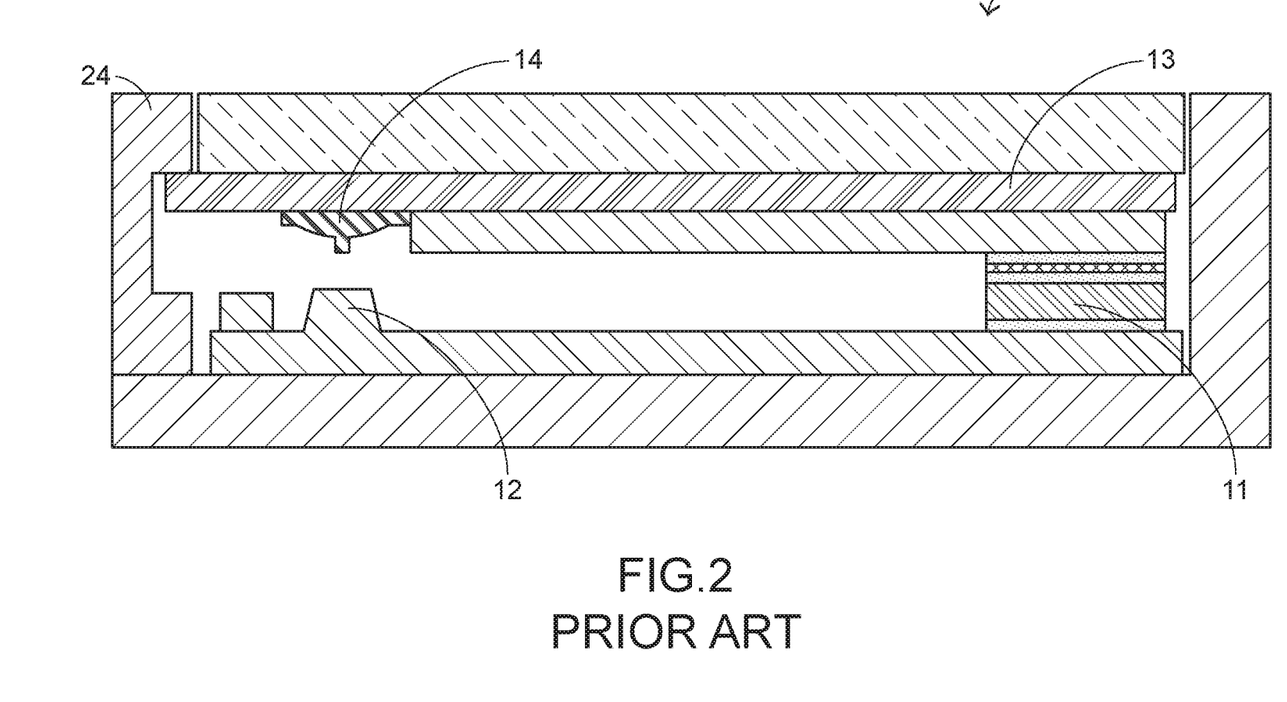
FIG. 2 is a schematic cross-sectional view illustrating the touchpad module as shown in FIG. 1, in which the touchpad module is not pressed down.
Figure 3:
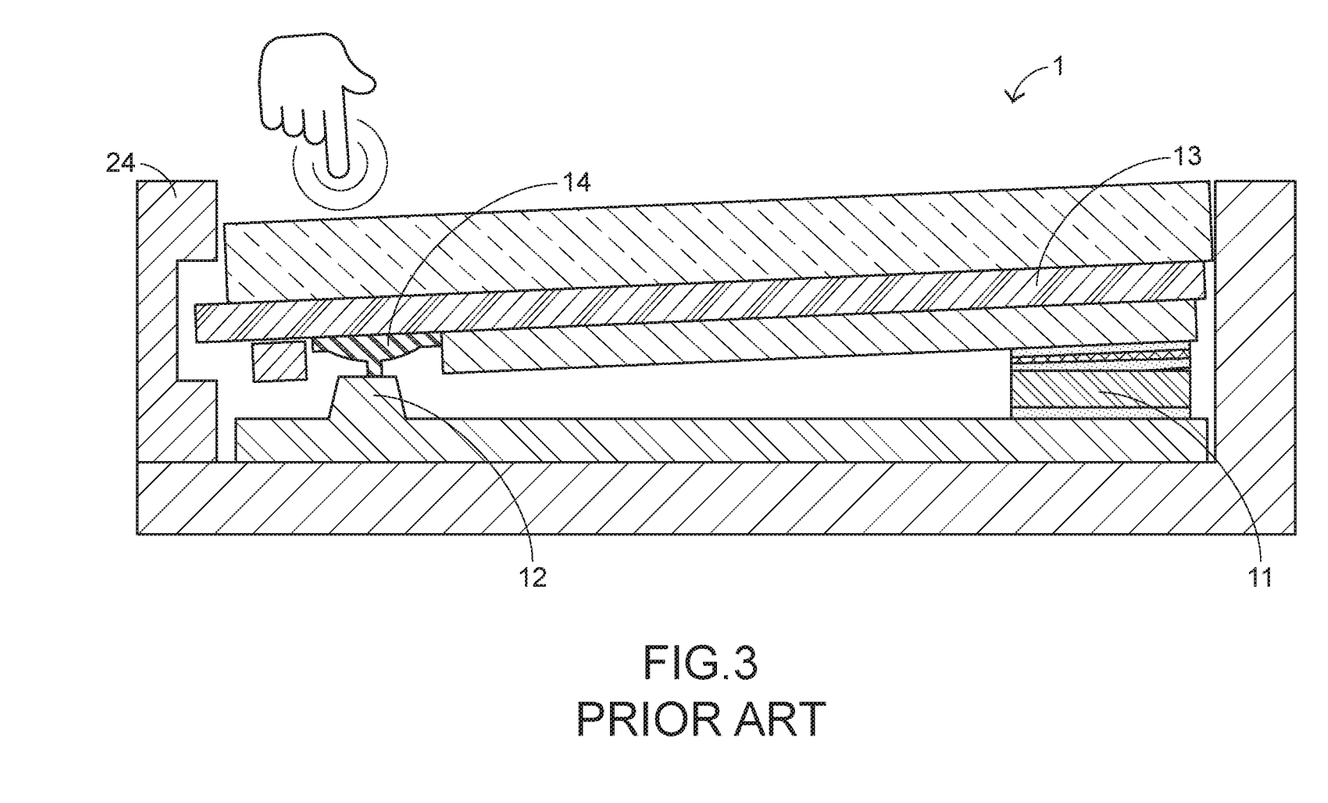
FIG. 3 is a schematic cross-sectional view illustrating the touchpad module as shown in FIG. 2, in which the touchpad module is pressed down.

FIG. 2 is a schematic cross-sectional view illustrating the touchpad module as shown in FIG. 1, in which the touchpad module is not pressed down. FIG. 3 is a schematic cross-sectional view illustrating the touchpad module as shown in FIG. 2, in which the touchpad module is pressed down. As shown in FIGS. 2 and 3, a fixing frame 24 is concavely formed in the casing 21 of the notebook computer 2. The touchpad module 1 is installed within the fixing frame 24. The touchpad module 1 comprises a supporting structure 11, a triggering part 12 and a touch member 13. The supporting structure 11 and the triggering part 12 are located at two opposite sides of the fixing frame 24. The touch member 13 of the touchpad module 1 is connected with the supporting structure 11. Consequently, the touch member 13 of the touchpad module 1 can be swung relative to the triggering part 12 by using the supporting structure 11 as a fulcrum.

The touchpad module 1 further comprises a switch 14. The switch 14 is located under the touch member 13 and aligned with the triggering part 12.

While the touch member 13 is pressed down by the user, the touch member 13 is swung downwardly relative to the triggering part 12 by using the supporting structure 11 as a fulcrum. When the switch 14 of the touchpad module 1 is pushed by the triggering part 12 of the fixing frame 24, the switch 14 is triggered to generate a switch signal to the notebook computer 2. According to the switch signal, the notebook computer 2 executes a corresponding function. When the touch member 13 is no longer pressed by the user, the touch member 13 is swung upwardly relative to the triggering part 12 in response to the elastic force of the supporting structure 11. Consequently, the touch member 13 is returned to its original position.

Generally, the supporting structure 11 is connected with the upper component and the lower component through iron elements or plastic structures (e.g., sponge structures). Consequently, as the iron elements or the plastic structures are subjected to deformation, the touch member 13 can be swung upwardly or downwardly. However, the conventional touchpad module 10 still has some drawbacks. For example, the region of the touch member 13 that is aligned with the supporting structure 11 cannot be pressed down, but only the region of the touch member 13 that is not aligned with the supporting structure 11 can be pressed down. In other words, the touch member 13 of the touchpad module 10 can be locally pressed down only. Due to the structural design of the conventional touchpad module 10, it is unable to press down the whole surface of the touch member 13.

Therefore, there is a need of providing an improved touchpad module in order to overcome the above drawbacks.

SUMMARY OF THE INVENTION

An object of the present invention provides a touchpad module. Due to the structural design, the whole region of a touch member of the touchpad module can be pressed down. Consequently, the problem of locally pressing down the touch member of the conventional touchpad module can be overcome.

The other objects and advantages of the present invention will be understood from the disclosed technical features.

In accordance with an aspect of the present invention, a touchpad module for a computing device is provided. The touchpad module is installed within a fixing frame of the computing device. The touchpad module includes a base plate, a touch member, plural supporting elements, plural pressure sensing units and a feedback generation element. The base plate includes a plate body and plural elastic arms. The plural elastic arms are formed on the plate body. The touch member is located over the base plate. When the touch member is pressed in response to an external force, the touch member is moved toward the base plate. The plural supporting elements are arranged between the base plate and the touch member, and aligned with the corresponding elastic arms, respectively. While the touch member is moved toward the base plate, the plural supporting elements are move downwardly with the touch member to press the corresponding elastic arms. Consequently, the plural elastic arms are subjected to deformation, and each of the plural elastic arms has a deformation amount. The plural pressure sensing units are located under the touch member. Moreover, the plural pressure sensing units are aligned with the corresponding elastic arms of the plate body, respectively. If the deformation amount of at least one of the plural elastic arms reaches a threshold value, the corresponding pressure sensing unit issues a pressure sensing signal. The feedback generation element is electrically connected with the plural pressure sensing units. The feedback generation element generates a haptics feedback effect in response to the pressure sensing signal.

In an embodiment, the touch member includes a covering plate and a main circuit board. The covering plate is located over the main circuit board. The plural supporting elements are installed on the main circuit board. The feedback generation element is installed on the main circuit board and electrically connected with the main circuit board. The feedback generation element is arranged between the plural supporting elements.

In an embodiment, the touchpad module further includes a flexible printed circuit board. The flexible printed circuit board is arranged between the plural supporting elements and the base plate. The flexible printed circuit board is electrically connected with the main circuit board. The plural pressure sensing units are installed on the flexible printed circuit board and electrically connected with the flexible printed circuit board.

In an embodiment, the flexible printed circuit board has a first surface and a second surface, which are opposed to each other. The first surface of the flexible printed circuit board faces the main circuit board. The second surface of the flexible printed circuit board faces the base plate. The plural pressure sensing units are installed on the second surface of the flexible printed circuit board.

In an embodiment, each of the plural elastic arms of base plate includes a swingable part and a hollow part, and the hollow part is formed in the swingable part. Each of the plural supporting elements is arranged between the touch member and the corresponding swingable part. Moreover, each of the plural pressure sensing units is inserted into the hollow part of the corresponding elastic arm.

In an embodiment, while the touch member is moved toward the base plate, the plural supporting elements are moved downwardly with the touch member to press the corresponding elastic arms. Consequently, the swingable part of each elastic arm is swung in a direction away from the plate body of the base plate to result in the deformation amount.

In an embodiment, the plate body of the base plate has a rectangular shape, and the plural elastic arms are respectively formed on four corners of the plate body.

In an embodiment, after the plate body of the base plate is subjected to a stamping process, the plural elastic arms are formed on the plate body.

In an embodiment, the feedback generation element is a linear resonant actuator.

In accordance with another aspect of the present invention, a computing device is provided. The computing device includes a casing, a processor and a touchpad module. A fixing frame is concavely formed in the casing. The processor is disposed within the casing. The touchpad module is disposed within the fixing frame and electrically connected with the processor. The touchpad module includes a base plate, a touch member, plural supporting elements, plural pressure sensing units and a feedback generation element. The base plate includes a plate body and plural elastic arms. The plural elastic arms are formed on the plate body. The touch member is located over the base plate. When the touch member is pressed in response to an external force, the touch member is moved toward the base plate. The plural supporting elements are arranged between the base plate and the touch member, and aligned with the corresponding elastic arms, respectively. While the touch member is moved toward the base plate, the plural supporting elements are move downwardly with the touch member to press the corresponding elastic arms. Consequently, the plural elastic arms are subjected to deformation, and each of the plural elastic arms has a deformation amount. The plural pressure sensing units are located under the touch member. Moreover, the plural pressure sensing units are aligned with the corresponding elastic arms of the plate body, respectively. If the deformation amount of at least one of the plural elastic arms reaches a threshold value, the corresponding pressure sensing unit issues a pressure sensing signal. The feedback generation element is electrically connected with the plural pressure sensing units. The feedback generation element generates a haptics feedback effect in response to the pressure sensing signal.

From the above descriptions, the structure of the touchpad module is specially designed. The whole region of the touch member of the touchpad module can be pressed down. Consequently, the problem of locally pressing the touch member of the conventional touchpad module can be overcome. Moreover, the touchpad module comprises plural pressure sensing units and the feedback generation element. When any region of the of the touch member is pressed down, the pressure sensing unit corresponding to the pressed region issues the pressure sensing signal. In response to the pressure sensing signal, the feedback generation element generates the haptics feedback effect like vibration. Consequently, the operating tactile feel of the user is enhanced. Moreover, since the structural design of the touchpad module is simplified and the touch module is assembled easily, the fabricating cost and the overall weight of the touchpad module are reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 4:
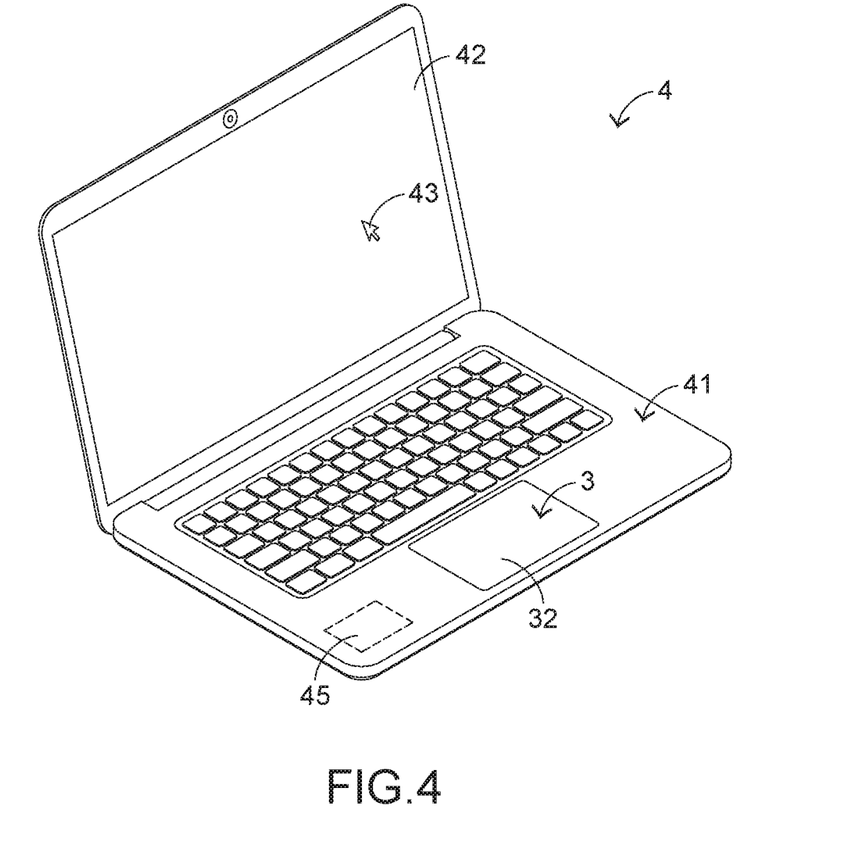
FIG. 4 is a schematic perspective view illustrating the outer appearance of a computing device with a touchpad module according to an embodiment of the present invention.

FIG. 4 is a schematic perspective view illustrating the outer appearance of a computing device with a touchpad module according to an embodiment of the present invention. An example of the computing device 4 includes but is not limited to a notebook computer. In an embodiment, the computing device 4 comprises a casing 41, a display screen 42, a processor 45 and a touchpad module 3. The processor 45 is disposed within the casing 41. The processor 45 is used for processing electronic signals of the computing device 4. Moreover, a fixing frame 44 is concavely formed in the casing 41 (see FIGS. 10A and 10B). The touchpad module 3 is disposed within the fixing frame 44 and electrically connected with the processor 45. In addition, at least a portion of the touchpad module 3 is exposed outside so as to be touched by the user's finger. Consequently, the user can operate the touchpad module 3 to control the computing device 4. For example, in case that the user's finger is placed on the touchpad module 3 and slid on the touchpad module 3, a cursor 43 shown on the display screen 42 is correspondingly moved. Moreover, in case that the touchpad module 3 is pressed down by the user's finger, the computing device 4 executes a specified function.

The other structure of the touchpad module 3 will be described in more details as follows.

Figure 5:
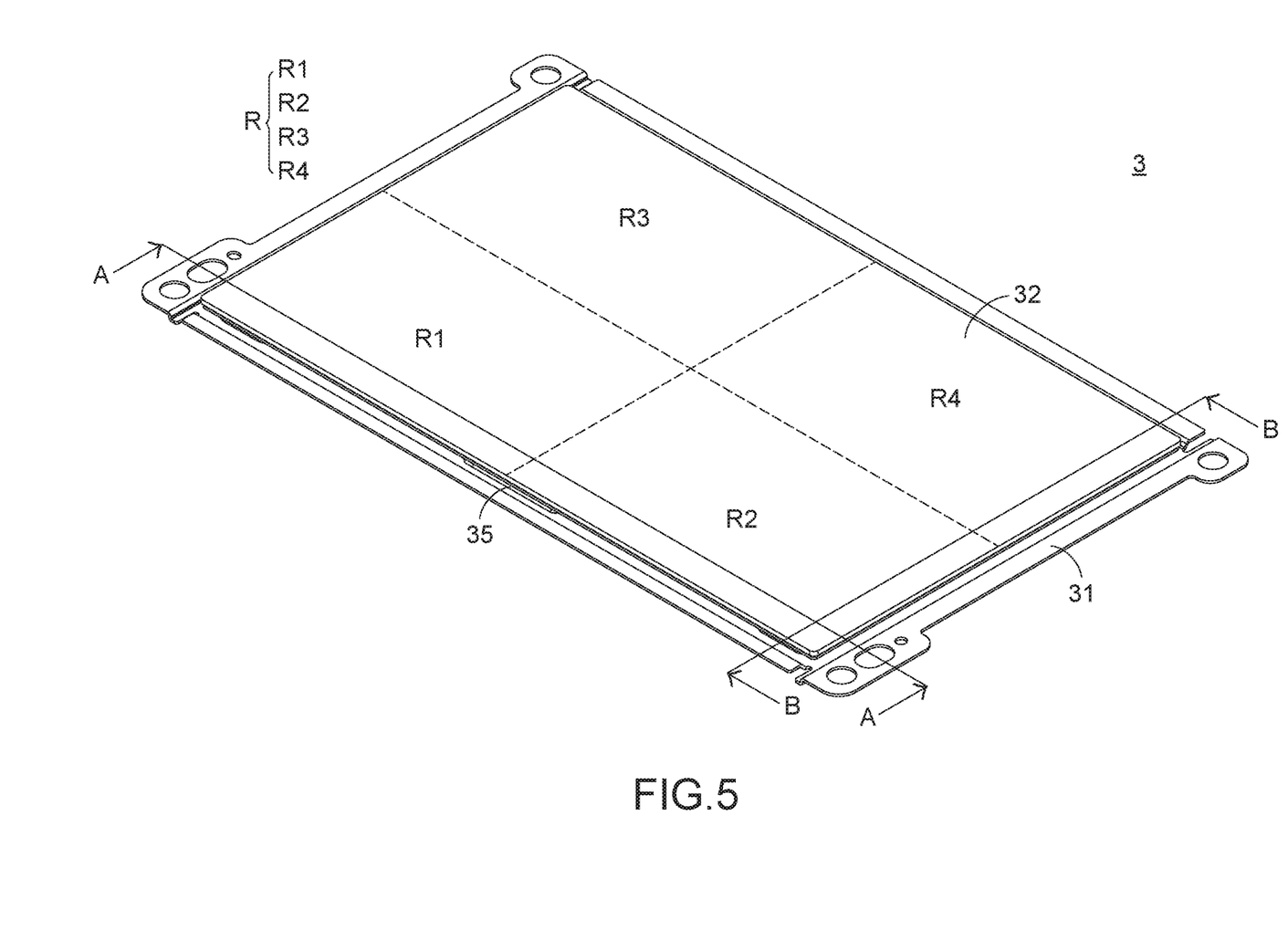
FIG. 5 is a schematic perspective view illustrating the appearance of the touchpad module as shown in FIG. 4.
Figure 6:
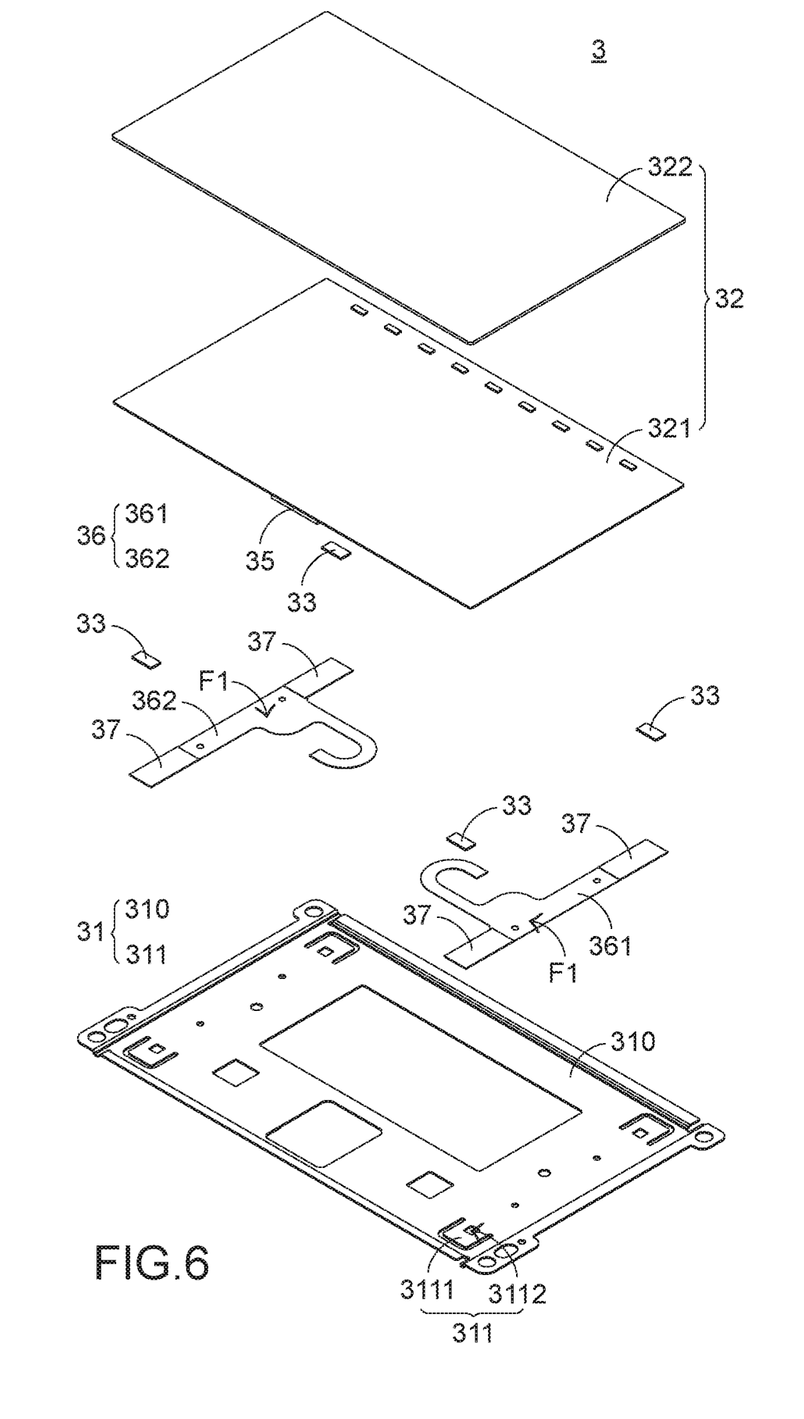
FIG. 6 is a schematic exploded view illustrating the touchpad module as shown in FIG. 5 and taken along a viewpoint.
Figure 7:
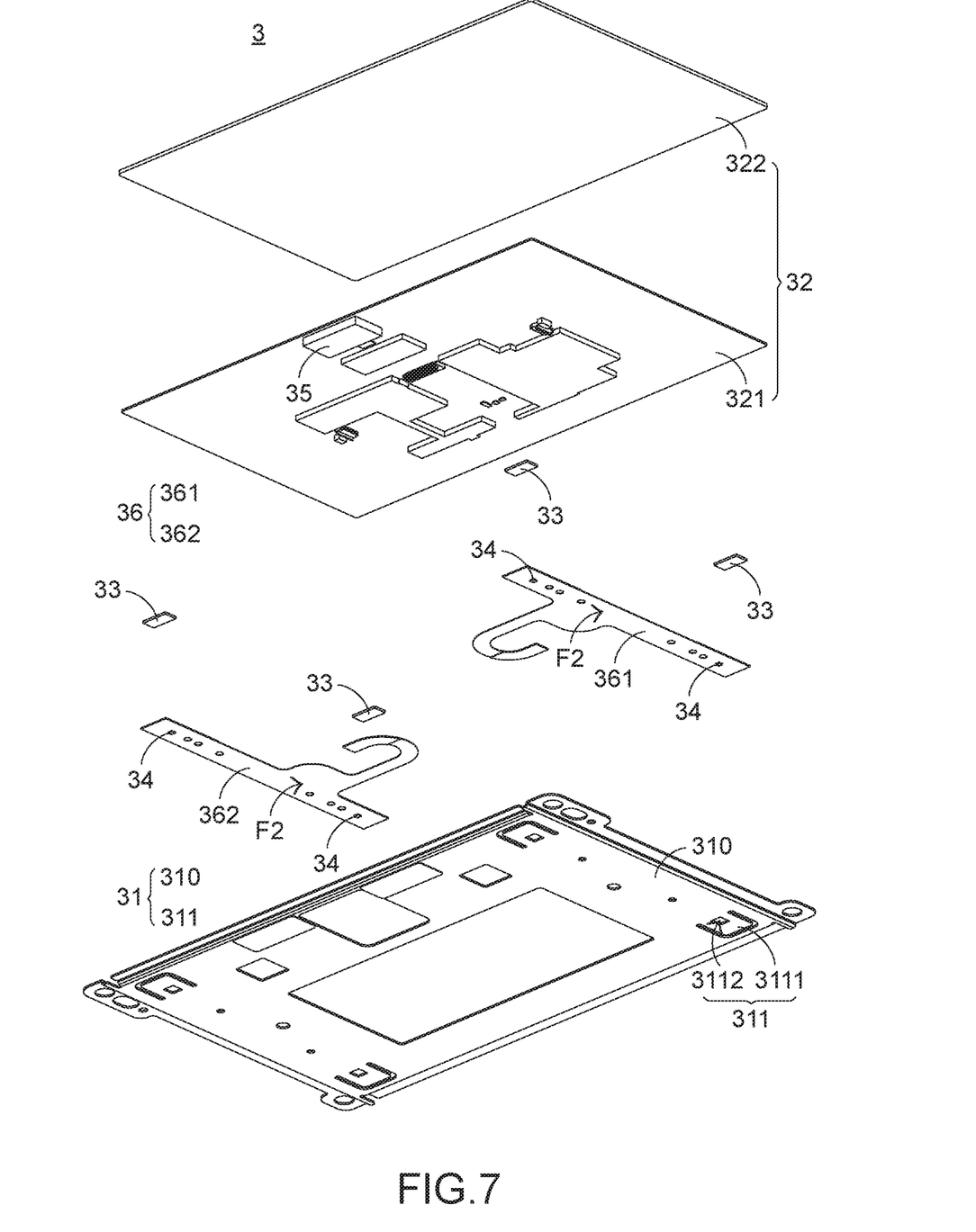
FIG. 7 is a schematic exploded view illustrating the touchpad module as shown in FIG. 5 and taken along another viewpoint.
Figure 8:
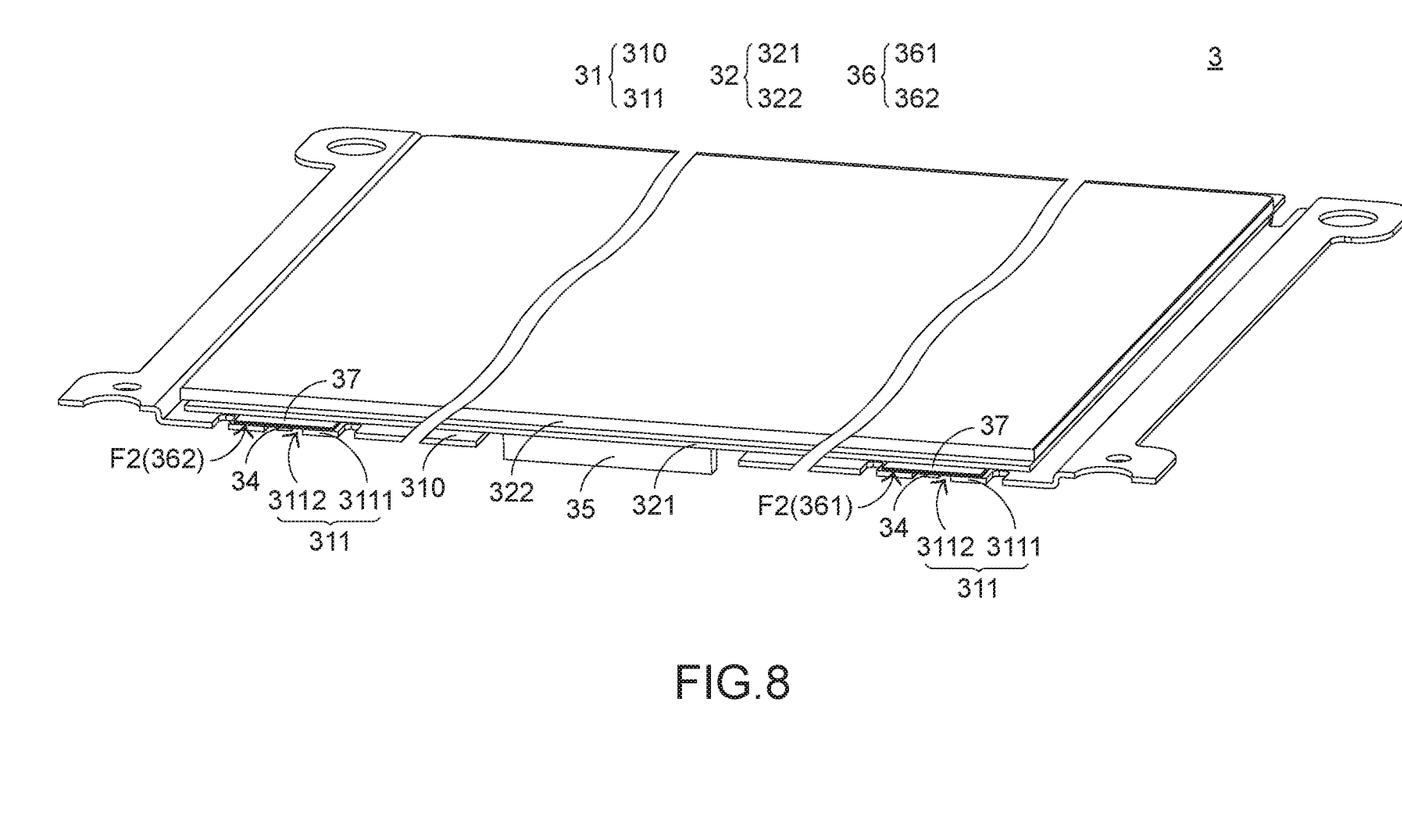
FIG. 8 is a schematic cutaway view illustrating the touchpad module as shown in FIG. 5 and taken along the line AA.
Figure 9:
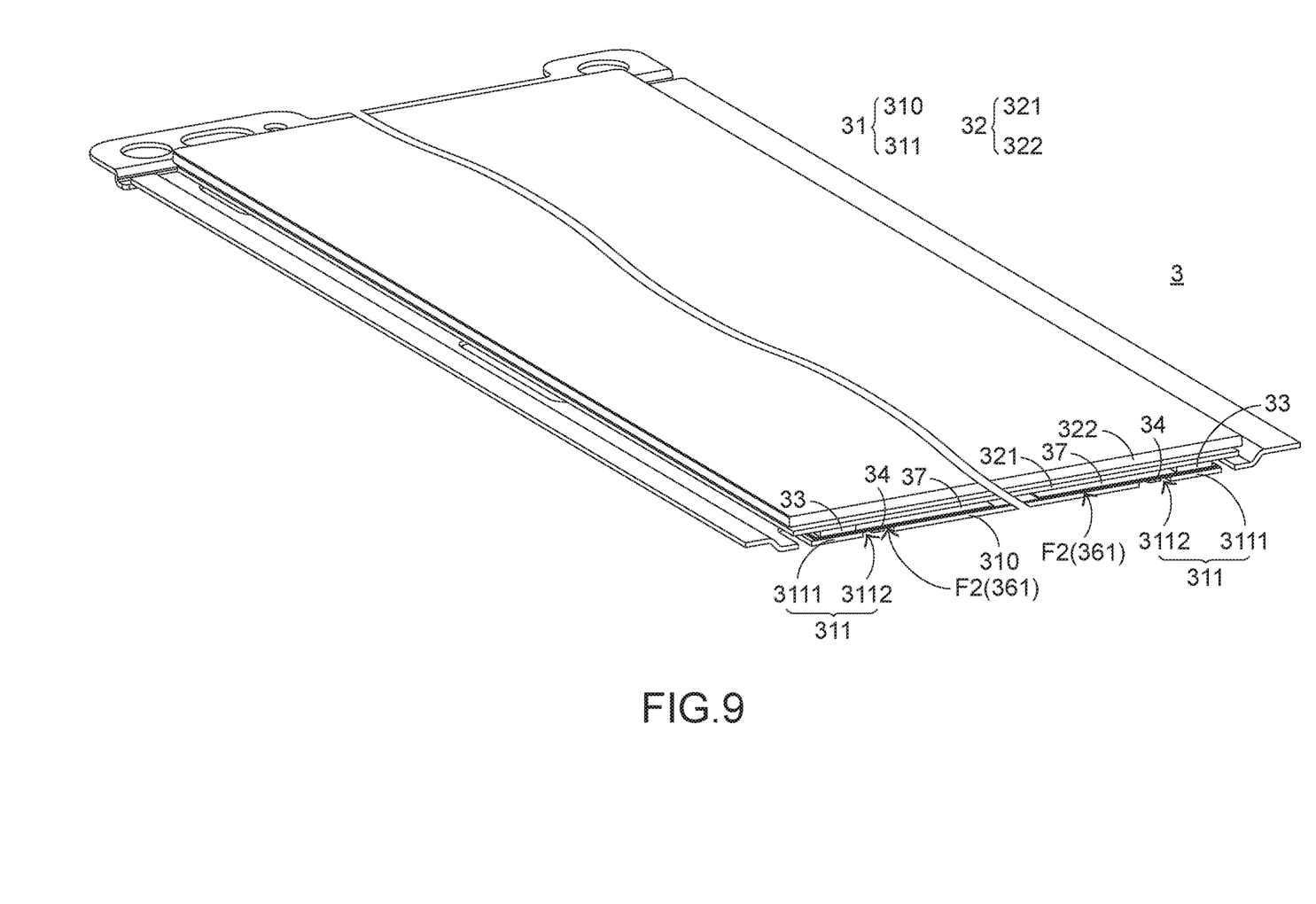
FIG. 9 is a schematic cutaway view illustrating the touchpad module as shown in FIG. 5 and taken along the line BB.

Please refer to FIGS. 5, 6, 7, 8 and 9. FIG. 5 is a schematic perspective view illustrating the appearance of the touchpad module as shown in FIG. 4. FIG. 6 is a schematic exploded view illustrating the touchpad module as shown in FIG. 5 and taken along a viewpoint. FIG. 7 is a schematic exploded view illustrating the touchpad module as shown in FIG. 5 and taken along another viewpoint. FIG. 8 is a schematic cutaway view illustrating the touchpad module as shown in FIG. 5 and taken along the line AA. FIG. 9 is a schematic cutaway view illustrating the touchpad module as shown in FIG. 5 and taken along the line BB.

Please refer to FIGS. 5, 6, 7, 8 and 9 again. In an embodiment, the touchpad module 3 comprises a base plate 31, a touch member 32, plural supporting elements 33, plural pressure sensing units 34 and a feedback generation element 35. The base plate 31 comprises a plate body 310 and plural elastic arms 311. The plural elastic arms 311 are formed on the plate body 310. The touch member 32 is located over the base plate 31. When the touch member 32 is pressed in response to an external force, the touch member 32 can be moved toward the base plate 31. The plural supporting elements 33 are arranged between the base plate 31 and the touch member 32. Moreover, the plural supporting elements 33 are aligned with the corresponding elastic arms 311 of the plate body 310, respectively. The plural pressure sensing units 34 are located under the touch member 32. Moreover, the plural pressure sensing units 34 are aligned with the corresponding elastic arms 311 of the plate body 310, respectively. The feedback generation element 35 is electrically connected with the plural pressure sensing units 34.

While the touch member 32 is pressed in response to the external force and the touch member 32 is moved toward the base plate 31, the supporting elements 33 are moved downwardly with the touch member 32 to press the corresponding elastic arms 311. Consequently, the plural elastic arms 311 are subjected to deformation, and each of the plural elastic arms 311 has a deformation amount. If the deformation amount of at least one of the elastic arms 311 reaches a threshold value, the corresponding pressure sensing unit 34 issues a pressure sensing signal. In response to the pressure sensing signal, the feedback generation element 35 generates a haptics feedback effect. Preferably but not exclusively, the feedback generation element 35 is a linear resonant actuator. In response to the pressure sensing signal, the feedback generation element 35 generates the haptics feedback effect like vibration. Consequently, the operating tactile feel of the user is enhanced.

In this embodiment, the plate body 310 of the base plate 31 has a rectangular shape, and four elastic arms 311 are formed on the plate body 310. In other words, the four elastic arms 311 are partial structures of the plate body 310. For example, after the plate body 310 is subjected to a stamping process, the four elastic arms 311 are respectively formed on four corners of the plate body 310. Moreover, the plural supporting elements 33 include four supporting elements 33, and the plural pressure sensing units 34 include four pressure sensing units 34. It is noted that the numbers of the elastic arms 311, the supporting elements 33 and the pressure sensing units 34 are not restricted. In case that the entire of the exposed surface region R of the touch member 32 can be pressed by the user, each of the numbers of the elastic arms 311, the supporting elements 33 and the pressure sensing units 34 may be increased to be more than four. Preferably but not exclusively, the base plate 31 is made of a metallic material or any other appropriate material.

Please refer to FIGS. 5, 6, 7, 8 and 9 again. In an embodiment, the touch member 32 comprises a main circuit board 321 and a covering plate 322. The covering plate 322 is located over the main circuit board 321. The plural supporting elements 33 are installed on the main circuit board 321. The feedback generation element 35 is installed on the main circuit board 321 and electrically connected with the main circuit board 321. Moreover, the feedback generation element 35 is arranged between the plural supporting elements 33. Preferably but not exclusively, the covering plate 322 is made of glass or any other appropriate material. The material of the covering plate 322 may be varied according to the practical requirements. Moreover, the main circuit board 321 and the covering plate 322 are combined together through a pressure sensitive adhesive (PSA) or any other appropriate material.

Please refer to FIGS. 5, 6, 7, 8 and 9 again. In an embodiment, the touchpad module 3 further comprises a flexible printed circuit board 36. The flexible printed circuit board 36 is arranged between the plural supporting elements 33 and the base plate 31. Moreover, the flexible printed circuit board 36 is electrically connected with the main circuit board 321. The plural pressure sensing units 34 are installed on the flexible printed circuit board 36 and electrically connected with the flexible printed circuit board 36. As mentioned above, if the deformation amount of at least one of the elastic arms 311 reaches the threshold value, the corresponding pressure sensing unit 34 issues the pressure sensing signal. Moreover, the pressure sensing signal is transmitted to the main circuit board 321 through the flexible printed circuit board 36. In response to the pressure sensing signal, a control unit (not shown) installed on the main circuit board 321 drives the feedback generation element 35 to generate the haptics feedback effect (e.g., the vibration feedback effect).

Please refer to FIGS. 5, 6, 7, 8 and 9 again. In an embodiment, the flexible printed circuit board 36 has a first surface F1 and a second surface F2, which are opposed to each other. The first surface F1 of the flexible printed circuit board 36 faces the main circuit board 321. The second surface F2 of the flexible printed circuit board 36 faces the base plate 31. The plural pressure sensing units 34 are installed on the second surface F2 of the flexible printed circuit board 36. Moreover, the second surface F2 of the flexible printed circuit board 36 is attached on the base plate 31. The plural supporting elements 33 are located over the first surface F1 of the flexible printed circuit board 36 faces the main circuit board 321. In an embodiment, the touchpad module 3 further comprises plural buffering structures 37. The buffering structures 37 are arranged between the plural supporting elements 33 and the first surface F1 of the flexible printed circuit board 36. Due to the arrangement of the buffering structures 37, the plural supporting elements 33 are not in direct contact with the flexible printed circuit board 36. Consequently, while the plural elastic arms 311 are pressed by the corresponding supporting elements 33, the possibility of causing damage of the flexible printed circuit board 36 will be minimized.

In an embodiment, the flexible printed circuit board 36 comprises a first part 361 and a second part 362. The first part 361 of the flexible printed circuit board 36 is electrically connected with a first side of the main circuit board 321. The second part 362 of the flexible printed circuit board 36 is electrically connected with a second side of the main circuit board 321. Some of the plural pressure sensing units 34 are installed on the first part 361 of the flexible printed circuit board 36. The other pressure sensing units 34 of the plural pressure sensing units 34 are installed on the second part 362 of the flexible printed circuit board 36. For example, in this embodiment, two pressure sensing units 34 are installed on the first part 361 of the flexible printed circuit board 36, and the other two pressure sensing units 34 are installed on the second part 362 of the flexible printed circuit board 36.

Please refer to FIGS. 5, 6, 7, 8 and 9 again. In an embodiment, each of the elastic arms 311 comprises a swingable part 3111 and a hollow part 3112. The hollow part 3112 is formed in the swingable part 3111. In an embodiment, each of the plural supporting elements 33 is arranged between the touch member 32 and the corresponding swingable part 3111. While the touch member 32 is moved toward the base plate 31, the supporting elements 33 are moved downwardly with the touch member 32 to press the corresponding elastic arms 311. As the elastic arms 311 are pressed by the supporting elements 33, the swingable parts 3111 of the elastic arms 311 are swung in the direction away from the plate body 310 of the base plate 31. Consequently, each of the plural swingable parts 3111 of the elastic arms 311 has the deformation amount. When the second surface F2 of the flexible printed circuit board 36 is attached on the base plate 31, the pressure sensing units 34 on the second surface F2 of the flexible printed circuit board 36 are inserted into the hollow parts 3112 of the corresponding elastic arms 311. In other words, the pressure sensing units 34 are not in direct contact with the swingable parts 3111 of the corresponding elastic arms 311. Consequently, while the swingable parts 3111 are swung, the corresponding pressure sensing units 34 are not damaged by the swingable parts 3111.

The operations of the touchpad module 3 will be described in more details as follows.

Figure 10A:
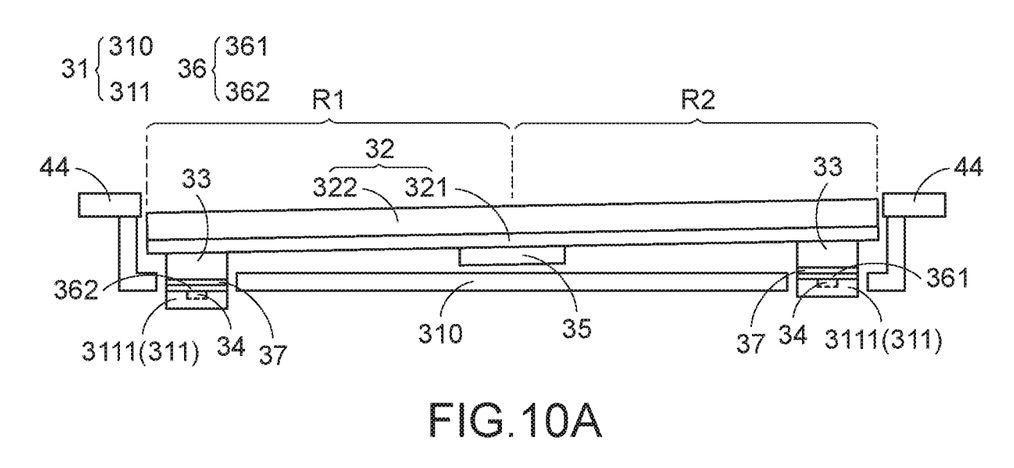
FIGS. 10A and 10B are schematic cross-sectional views illustrating the operations of the touchpad module as shown in FIG. 5.
Figure 10B:
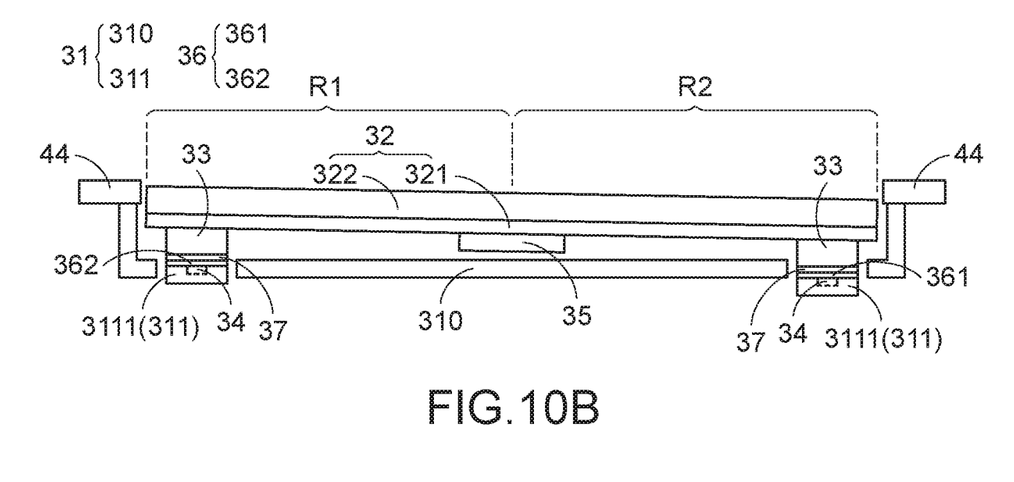

FIGS. 10A and 10B are schematic cross-sectional views illustrating the operations of the touchpad module as shown in FIG. 5. Please also refer to FIGS. 5, 6, 7, 8 and 9. As mentioned above, the entire of the exposed surface region R of the touch member 32 can be pressed by the user. That is, the whole region of the touch member 32 can be pressed down. For illustration, the surface region R of the touch member 32 is divided into a lower left region R1, a lower right region R2, an upper left region R3 and an upper right region R4. Moreover, a corresponding supporting element 33, a corresponding pressure sensing unit 34 and a corresponding elastic arm 311 are located under each of the lower left region R1, the lower right region R2, the upper left region R3 and the upper right region R4.

Please refer to FIG. 10A. When the lower left region R1 of the touch member 32 is pressed in response to an external force, the touch member 32 is moved toward the base plate 31. While the touch member 32 is moved toward the base plate 31, the supporting elements 33 are moved downwardly with the touch member 32 to press the corresponding elastic arms 311. Consequently, the elastic arms 311 are subjected to deformation, and each of the elastic arms 311 has the deformation amount. The deformation amount of each elastic arm 311 represents the displacement of swinging the corresponding swingable part 3111 in the direction away from the base plate 31. Since the greatest portion of the external force is applied to the lower left region R1 of the touch member 32, the elastic arm 311 that is located under the lower left region R1 of the touch member 32 and pressed by the corresponding supporting element 33 has the largest deformation amount. Under this circumstance, the deformation amount of the elastic arm 311 under the lower left region R1 of the touch member 32 reaches the threshold value. Consequently, the corresponding pressure sensing unit 34 issues a pressure sensing signal. In response to the pressure sensing signal, the feedback generation element 35 generates a haptics feedback effect (e.g., a vibration feedback effect).

Please refer to FIG. 10B. When the lower right region R2 of the touch member 32 is pressed in response to an external force, the touch member 32 is moved toward the base plate 31. While the touch member 32 is moved toward the base plate 31, the supporting elements 33 are moved downwardly with the touch member 32 to press the corresponding elastic arms 311. Consequently, the elastic arms 311 are subjected to deformation, and each of the elastic arms 311 has the deformation amount. Since the greatest portion of the external force is applied to the lower right region R2 of the touch member 32, the elastic arm 311 that is located under the lower right region R2 of the touch member 32 and pressed by the corresponding supporting element 33 has the largest deformation amount. Under this circumstance, the deformation amount of the elastic arm 311 under the lower right region R2 of the touch member 32 reaches the threshold value. Consequently, the corresponding pressure sensing unit 34 issues a pressure sensing signal. In response to the pressure sensing signal, the feedback generation element 35 generates a haptics feedback effect (e.g., a vibration feedback effect).

In practice, when the lower left region R1 or the lower right region R2 of the touch member 32 is pressed, all of the elastic arms 311 of the base plate 31 are pressed by the corresponding supporting elements 33 and subjected to deformation. Since the greatest portion of the external force is applied to the pressed region of the touch member 32 (i.e., lower left region R1 or the lower right region R2), the elastic arm 311 corresponding to the pressed region of the touch member 32 (i.e., lower left region R1 or the lower right region R2) has the largest deformation amount. Moreover, the deformation amount of the elastic arm 311 reaches the threshold value. Consequently, the corresponding pressure sensing unit 34 issues the pressure sensing signal. The deformation amounts of the other elastic arms 311 do not reach the threshold value, and thus the corresponding pressure sensing unit 34 will not issue the pressure sensing signal. When the upper left region R3 or the upper right region R4 of the touch member 32 is pressed, the operations of the touchpad module 3 are similar to those of FIGS. 10A and 10B, and not redundantly described herein.

From the above descriptions, the structure of the touchpad module is specially designed. The whole region of the touch member of the touchpad module can be pressed down. Consequently, the problem of locally pressing the touch member of the conventional touchpad module can be overcome. Moreover, the touchpad module comprises plural pressure sensing units and the feedback generation element. When any region of the of the touch member is pressed down, the pressure sensing unit corresponding to the pressed region issues the pressure sensing signal. In response to the pressure sensing signal, the feedback generation element generates the haptics feedback effect like vibration. Consequently, the operating tactile feel of the user is enhanced. Moreover, since the structural design of the touchpad module is simplified and the touch module is assembled easily, the fabricating cost and the overall weight of the touchpad module are reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the touchpad module being installed within a fixing frame of the computing device, the touchpad module comprising:
   a base plate comprising a plate body and plural elastic arms, wherein the plural elastic arms are formed on the plate body;
   a touch member located over the base plate, wherein when the touch member is pressed in response to an external force, the touch member is moved toward the base plate;
   plural supporting elements arranged between the base plate and the touch member, and aligned with the corresponding elastic arms, respectively, wherein while the touch member is moved toward the base plate, the plural supporting elements are move downwardly with the touch member to press the corresponding elastic arms, so that the plural elastic arms are subjected to deformation and each of the plural elastic arms has a deformation amount;
   plural pressure sensing units located under the touch member, and aligned with the corresponding elastic arms of the plate body, respectively, wherein if the deformation amount of at least one of the plural elastic arms reaches a threshold value, the corresponding pressure sensing unit issues a pressure sensing signal; and
   a feedback generation element electrically connected with the plural pressure sensing units, wherein the feedback generation element generates a haptics feedback effect in response to the pressure sensing signal.

2. The touchpad module according to claim 1, wherein the touch member comprises a covering plate and a main circuit board, wherein the covering plate is located over the main circuit board, the plural supporting elements are installed on the main circuit board, the feedback generation element is installed on the main circuit board and electrically connected with the main circuit board, and the feedback generation element is arranged between the plural supporting elements.

3. The touchpad module according to claim 2, wherein the touchpad module further comprises a flexible printed circuit board, wherein the flexible printed circuit board is arranged between the plural supporting elements and the base plate, and the flexible printed circuit board is electrically connected with the main circuit board, wherein the plural pressure sensing units are installed on the flexible printed circuit board and electrically connected with the flexible printed circuit board.

4. The touchpad module according to claim 3, wherein the flexible printed circuit board has a first surface and a second surface, which are opposed to each other, wherein the first surface of the flexible printed circuit board faces the main circuit board, the second surface of the flexible printed circuit board faces the base plate, and the plural pressure sensing units are installed on the second surface of the flexible printed circuit board.

5. The touchpad module according to claim 1, wherein each of the plural elastic arms of base plate comprises a swingable part and a hollow part, and the hollow part is formed in the swingable part, wherein each of the plural supporting elements is arranged between the touch member and the corresponding swingable part, and each of the plural pressure sensing units is inserted into the hollow part of the corresponding elastic arm.

6. The touchpad module according to claim 5, wherein while the touch member is moved toward the base plate, the plural supporting elements are moved downwardly with the touch member to press the corresponding elastic arms, so that the swingable part of each elastic arm is swung in a direction away from the plate body of the base plate to result in the deformation amount.

7. The touchpad module according to claim 1, wherein the plate body of the base plate has a rectangular shape, and the plural elastic arms are respectively formed on four corners of the plate body.

8. The touchpad module according to claim 1, wherein after the plate body of the base plate is subjected to a stamping process, the plural elastic arms are formed on the plate body.

9. The touchpad module according to claim 1, wherein the feedback generation element is a linear resonant actuator.

10. A computing device, comprising:
    a casing, wherein a fixing frame is concavely formed in the casing;
    a processor disposed within the casing; and
    a touchpad module disposed within the fixing frame and electrically connected with the processor, wherein the touchpad module comprises:
      a base plate comprising a plate body and plural elastic arms, wherein the plural elastic arms are formed on the plate body;
      a touch member located over the base plate, wherein when the touch member is pressed in response to an external force, the touch member is moved toward the base plate;
      plural supporting elements arranged between the base plate and the touch member, and aligned with the corresponding elastic arms, respectively, wherein while the touch member is moved toward the base plate, the plural supporting elements are move downwardly with the touch member to press the corresponding elastic arms, so that the plural elastic arms are subjected to deformation and each of the plural elastic arms has a deformation amount;

plural pressure sensing units located under the touch member, and aligned with the corresponding elastic arms of the plate body, respectively, wherein if the deformation amount of at least one of the plural elastic arms reaches a threshold value, the corresponding pressure sensing unit issues a pressure sensing signal; and a feedback generation element electrically connected with the plural pressure sensing units, wherein the feedback generation element generates a haptics feedback effect in response to the pressure sensing signal.

* * * * *